(12) United States Patent
Sadiq et al.

(10) Patent No.: US 11,283,540 B2
(45) Date of Patent: Mar. 22, 2022

(54) CELL-SPECIFIC INTERLEAVING, RATE-MATCHING, AND/OR RESOURCE ELEMENT MAPPING

(71) Applicant: QUALCOMM Incorporated, San Diego, CA (US)

(72) Inventors: Bilal Sadiq, Basking Ridge, NJ (US); Muhammad Nazmul Islam, Edison, NJ (US); Navid Abedini, Somerset, NJ (US); Peter Gaal, San Diego, CA (US); Alexei Yurievitch Gorokhov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/151,125

(22) Filed: Oct. 3, 2018

(65) Prior Publication Data

US 2019/0109670 A1    Apr. 11, 2019

Related U.S. Application Data

(60) Provisional application No. 62/569,234, filed on Oct. 6, 2017.

(51) Int. Cl.
*H04L 1/00* (2006.01)
*H04L 5/00* (2006.01)
(Continued)

(52) U.S. Cl.
CPC .......... *H04L 1/0013* (2013.01); *H04L 1/0067* (2013.01); *H04L 1/0071* (2013.01);
(Continued)

(58) Field of Classification Search
CPC ... H04L 1/0013; H04L 1/0067; H04L 1/0071; H04L 1/0072; H04L 5/003; H04L 5/0053;
(Continued)

(56) References Cited

U.S. PATENT DOCUMENTS

| | | | | |
|---|---|---|---|---|
| 2010/0118800 A1* | 5/2010 | Kim | ...................... | H04L 1/0071 370/329 |
| 2010/0124197 A1* | 5/2010 | Pi | .......................... | H04L 5/0037 370/329 |

(Continued)

OTHER PUBLICATIONS

Ericsson, "CCE-to-RE mapping", TSG-RAN WG1 #49, R1-072470, Kobe, May 7-11, 2007 (Year: 2007).*

(Continued)

*Primary Examiner* — Kwang B Yao
*Assistant Examiner* — Xuan Lu
(74) *Attorney, Agent, or Firm* — Arent Fox, LLP

(57) ABSTRACT

Aspects herein relate to inter-cell interference randomization between two or more cells. For example, a network entity may determine a cell identifier associated with the network entity and perform at least one of an interleaving, rate-matching, or resource element mapping on at least one codeword based on the cell identifier. The network entity may further communicate with a user equipment (UE) in accordance with performing at least one of the interleaving, rate-matching, or resource element mapping on the at least one codeword. In another example, a UE may receive a message from a network entity on a communication channel and identify a cell identifier associated with the network entity. The UE may further perform at least one of a de-interleaving, de-rate-matching, or resource element de-mapping on the message based on the cell identifier.

24 Claims, 5 Drawing Sheets

(51) Int. Cl.
*H04W 76/11* (2018.01)
*H04W 72/04* (2009.01)

(52) U.S. Cl.
CPC ............ *H04L 1/0072* (2013.01); *H04L 5/003* (2013.01); *H04L 5/0053* (2013.01); *H04L 5/0073* (2013.01); *H04L 5/0094* (2013.01); *H04W 72/0453* (2013.01); *H04W 76/11* (2018.02); *H04L 5/001* (2013.01)

(58) Field of Classification Search
CPC ..... H04L 5/0073; H04L 5/001; H04L 5/0094; H04L 72/0453; H04W 76/11; H04W 72/0453
USPC ......................................................... 370/329
See application file for complete search history.

(56) References Cited

U.S. PATENT DOCUMENTS

| | | | | |
|---|---|---|---|---|
| 2011/0256868 | A1* | 10/2011 | Nogami | H04J 11/0069 455/435.1 |
| 2012/0155362 | A1* | 6/2012 | Montojo | H04H 20/71 370/312 |
| 2012/0320880 | A1* | 12/2012 | Han | H04L 5/001 370/335 |
| 2013/0114431 | A1* | 5/2013 | Koivisto | H04B 7/024 370/252 |
| 2013/0315195 | A1* | 11/2013 | Ko | |
| 2015/0016371 | A1* | 1/2015 | Lee | H04L 5/0035 370/329 |
| 2015/0078348 | A1* | 3/2015 | Han | H04W 4/70 370/336 |
| 2015/0146644 | A1* | 5/2015 | Kim | H04L 5/0035 370/329 |
| 2015/0195820 | A1* | 7/2015 | Jung | H04L 5/0073 370/329 |
| 2015/0207601 | A1* | 7/2015 | Kim | H04L 5/0048 370/329 |
| 2016/0227578 | A1* | 8/2016 | Lee | H04W 74/0816 |
| 2017/0041932 | A1* | 2/2017 | Chae | H04W 72/0446 |
| 2017/0180086 | A1* | 6/2017 | Xiong | H04L 1/1854 |
| 2017/0208581 | A1* | 7/2017 | Yang | H04L 1/1854 |
| 2018/0131491 | A1* | 5/2018 | Xiong | H04L 1/0067 |
| 2018/0160363 | A1* | 6/2018 | Xu | H04W 48/10 |
| 2018/0176973 | A1* | 6/2018 | Kim | H04W 72/04 |
| 2018/0220458 | A1* | 8/2018 | Ouchi | H04W 74/0808 |
| 2018/0323897 | A1* | 11/2018 | Arnott | H04J 13/0022 |
| 2018/0337757 | A1* | 11/2018 | Noh | H04L 5/0048 |
| 2019/0007116 | A1* | 1/2019 | Chang | H04B 7/0684 |
| 2019/0028226 | A1* | 1/2019 | Uchiyama | H04W 72/042 |
| 2019/0357159 | A1* | 11/2019 | Pan | H04L 1/1861 |
| 2020/0259588 | A1* | 8/2020 | Iyer | H04L 5/0048 |

OTHER PUBLICATIONS

Samsung, "CCFI to RE mapping for multiple TX antennas", 3GPP TSG RAN WG1 Meeting #50bis, R1-074086, Oct. 8-12, 2007 (Year: 2007).*

LG Electronics, "Interleaver Design for CCE-to-RE Mapping", 3GPP TSG RAN WG1 Meeting #50bis, R1-074472, Oct. 8-12, 2007 (Year: 2007)*

Motorola: "P-BCH Design", 3GPP Draft; R1-072665—P-BCH, 3rd Generation Partnership Project (3GPP), Mobile Competence Centre ; 650, Route Des Lucioles ; F-06921 Sophia-Antipolis Cedex ; France, vol. RAN WGl, No. Orlando, USA; 20070620, Jun. 20, 2007 (Jun. 20, 2007), XP050106362, [retrieved on Jun. 20, 2007].

International Search Report and Written Opinion—PCT/US2018/054380—ISA/EPO—dated Jan. 16, 2019.

LG Electronics: "Interleaver Design for CCE-to-RE Mapping," 3GPP Draft; R1-074472, 3rd Generation Partnership Project (3GPP), Mobile Competence Centre; 650, Route Des Lucioles; F-06921 Sophia-Antipolis Cedex; France, vol. RAN WG1, No. Shanghai, China; Oct. 15, 2017, Oct. 15, 2007, XP050107977, 9 pages, [retrieved on Oct. 15, 2007].

Motorola: "Considerations on P-BCH Scrambling Sequence Design," 3GPP Draft; R1-073765—P-BCH SCRMBL. SDQ, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 15, 2007, Aug. 15, 2007, XP050107351, 2 pages, [retrieved on Aug. 15, 2007].

Ericsson: "CCE-to-RE Mapping", 3GPP Draft, TSG-RAN WG1 #49, R1-072470, 3rd Generation Partnership Project (3GPP), Mobile Competence Centre, 650, Route Des Lucioles, F-06921 Sophia-Antipolis Cedex, France, vol. RAN WG1, No. Kobe, Japan, May 2, 2007, May 2, 2007 (May 2, 2007), XP060206186, 3 pages, [Retrieved on May 2, 2007].

Samsung: "CCFI to RE Mapping TX Antennas", 3GPP Draft, 3GPP TSG RAN WG1 Meeting #50bis, R1-074086, Multi-Antenna CCFI Mapping, 3rd Generation Partnership Project (3GPP), Mobile Competence Centre, 650, Route Des Lucioles, F-06921 Sophia-Antipolis Cedex, France, vol. RAN WG1, No. Shanghai, China, Oct. 2, 2007, Oct. 2, 2007 (Oct. 2, 2007), XP050107623, 4 Pages, [Retrieved on Oct. 2, 2007].

Taiwan Search Report—TW107135089—TIPO—dated Oct. 24, 2021.

* cited by examiner

CELL-SPECIFIC INTERLEAVING, RATE-MATCHING, AND/OR RESOURCE ELEMENT MAPPING

CROSS-REFERENCE TO RELATED APPLICATION(S)

This application claims the benefit of U.S. Provisional Application Ser. No. 62/569,234, entitled "CELL-SPECIFIC INTERLEAVING, RATE-MATCHING, AND/OR RESOURCE ELEMENT MAPPING" and filed on Oct. 6, 2017, which is expressly incorporated by reference herein in its entirety.

BACKGROUND

Aspects of the present disclosure relate generally to wireless communication networks, and more particularly, to cell-specific interleaving, rate-matching, and/or resource element mapping of a physical broadcast channel (PBCH).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for various communications technology such as, but not limited to LTE and NR, reducing interference between cells and/or user equipments may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a network entity. The method may include determining a cell identifier associated with the network entity. The method may further include performing at least one of an interleaving, rate-matching, or resource element mapping on at least one codeword based on the cell identifier. The method may further include communicating with a user equipment (UE) in accordance with performing at least one of the interleaving, rate-matching, or resource element mapping on the at least one codeword.

In a further aspect, the present disclosure includes a network entity for wireless communications comprising a memory and at least one processor in communication with the memory. The at least one processor may be configured to determine a cell identifier associated with the network entity. The at least one processor may further be configured to perform at least one of an interleaving, rate-matching, or resource element mapping on at least one codeword based on the cell identifier. Additionally, the at least one processor may be configured to communicate with a user equipment in accordance with performing at least one of the interleaving, the rate-matching, or the resource element mapping on the at least one codeword.

In an additional aspect, the present disclosure includes a network entity for wireless communications. The network entity may include means for determining a cell identifier associated with the network entity. The network entity may further include means for performing at least one of an interleaving, rate-matching, or resource element mapping on at least one codeword based on the cell identifier. Additionally, the network entity may include means for communicating with a user equipment in accordance with performing at least one of the interleaving, the rate-matching, or the resource element mapping on the at least one codeword In yet another aspect, the present disclosure includes a computer-readable medium storing computer code executable by a processor for wireless communications at a network entity comprising code for determining a cell identifier associated with the network entity. The computer-readable medium may further include code for performing at least one of an interleaving, rate-matching, or resource element mapping on at least one codeword based on the cell identifier. The computer-readable medium may additionally include code for communicating with a user equipment in accordance with performing at least one of the interleaving, the rate-matching, or the resource element mapping on the at least one codeword.

In an aspect, the present disclosure includes a method for wireless communications at a UE. The method may include receiving a message from a network entity on a communication channel. The method may further include identifying a cell identifier associated with the network entity. The method may additionally include performing at least one of a de-interleaving, de-rate-matching, or resource element de-mapping on the message based on the cell identifier.

In a further aspect, the present disclosure includes a UE for wireless communications comprising a memory and at least one processor in communication with the memory. The at least one processor may be configured to receive a message from a network entity on a communication channel. The at least one processor may further be configured to identify a cell identifier associated with the network entity. Additionally, the at least one processor may be configured to perform at least one of a de-interleaving, a de-rate-matching, or a resource element de-mapping on the message based on the cell identifier.

In an additional aspect, the present disclosure includes a UE for wireless communications. The UE may include means for receiving a message from a network entity on a communication channel. The UE may further include means for identifying a cell identifier associated with the network entity. Additionally, the UE may include means for performing at least one of a de-interleaving, a de-rate-matching, or a resource element de-mapping on the message based on the cell identifier.

In yet another aspect, the present disclosure includes a computer-readable medium storing computer code executable by a processor for wireless communications at a UE. The computer-readable medium may include code for receiving a message from a network entity on a communication channel. The computer-readable medium may further include code for identifying a cell identifier associated with the network entity. The computer-readable medium may further include code for performing at least one of a de-interleaving, a de-rate-matching, or a resource element de-mapping on the message based on the cell identifier To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
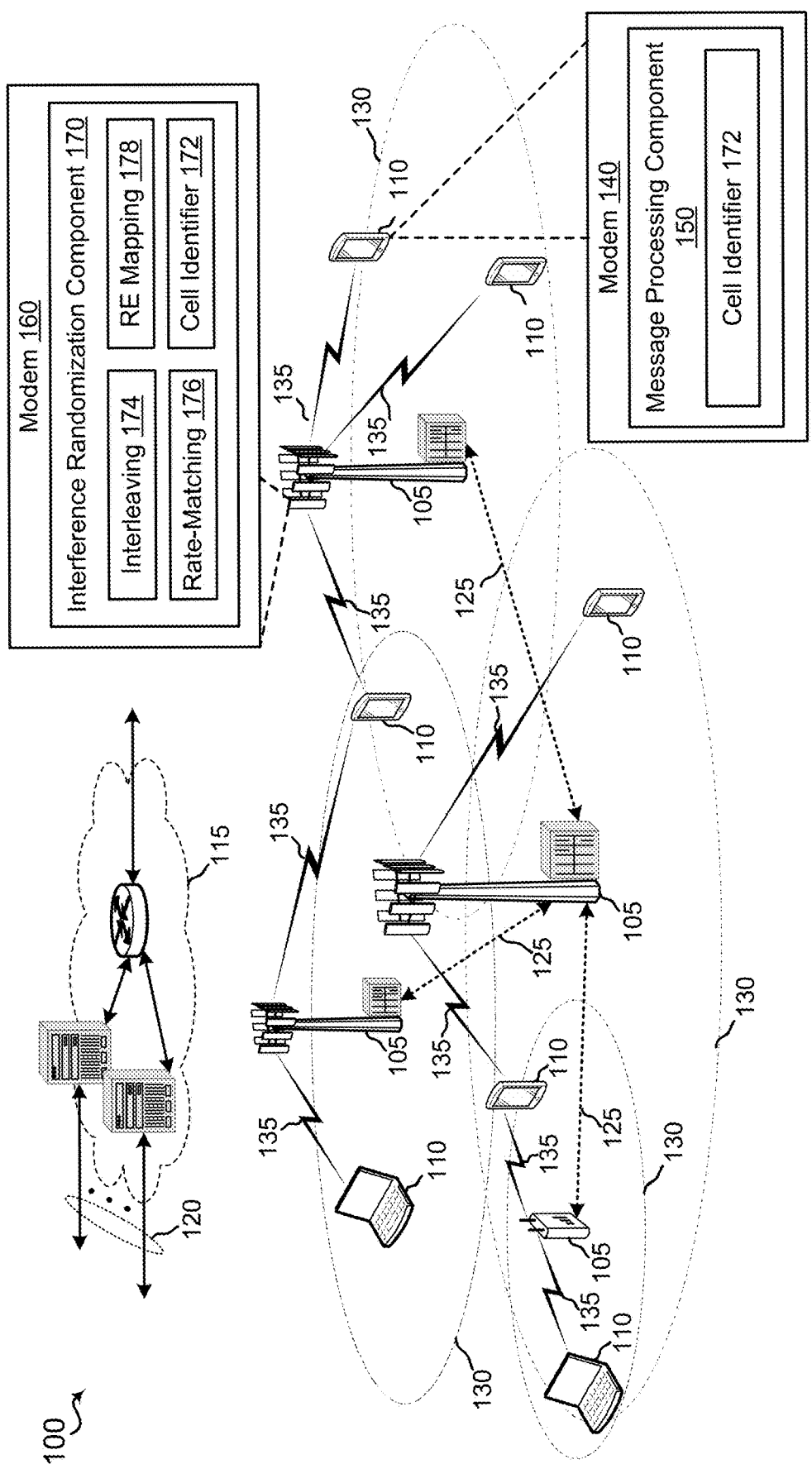
FIG. 1 is a schematic diagram of an example of a wireless communication network including at least one base station having an interference randomization component and at least one user equipment (UE) having a message processing component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to cell-specific interleaving, rate-matching, and/or resource element mapping of physical broadcast channel (PBCH). For example, in a new radio wireless communication system, the PBCH payload may carry timing bits that may change within a broadcast channel (BCH) transmission time interval (TTI) in an identical fashion across multiple cells. In some aspects, the timing bits may include a synchronization signal block index, burst-set index, and/or system frame number (SFN). Even though a payload may change, the change remains identical across cells, resulting in identical rate-matching, interleaving and resource element mapping across such cells. Hence, the inter-cell interference may not be randomized. As such, at least one of cell-specific rate-matching, cell-specific interleaving, and/or cell-specific resource element mapping can introduce inter-cell interference randomization in PBCH transmissions.

Further, for PBCH transmissions, there may be multiple synchronization signal blocks and burst-sets over a BCH TTI. These indices may increment in identical fashion over the BCH TTI for multiple cells, and thus even though data/payload may change from one synchronization signal block to another synchronization signal block, the PBCH codewords may not be randomized amongst different cells. For example, PBCH codewords of a first cell and a second cell may be identical over two transmissions in which synchronization signal block index increments for both cells from a first index to a second index. In other words, the codeword carrying the second index may be a scrambled version of the codeword carrying the first index, where such scrambling may be the same for multiple cells.

However, even though the indices may increment in identical fashion for multiple cells and thus the codewords of multiple cells are not randomized relative to each other, interference randomization may be implemented amongst cells by introducing cell-specific rate-matching, interleaving and/or resource element mapping of the codewords. That is, even if the indices/SFNs in PBCH payloads increment in an identical manner across cells, interference may be randomized amongst cells by introducing at least one of cell-specific rate-matching, cell-specific interleaving, and/or cell-specific resource element mapping at a transmitter (e.g., base station). Further, at a receiver end (e.g., UE), the receiver may use the cell identifier to de-rate-match and/or de-interleave and/or de-map the received message. The cell identifier may be already known to the receiver before attempting PBCH decode (e.g., from primary synchronization signal and/or secondary synchronization signal detection).

As such, in an aspect, the present aspects provide a network entity that may determine a cell identifier associated with the network entity. The network entity may further perform at least one of an interleaving, rate-matching, or resource element mapping on at least one codeword based on the cell identifier. Moreover, the network entity may communicate with a user equipment in accordance with performing at least one of the interleaving, rate-matching, or resource element mapping on the at least one codeword.

The present aspects also provide a UE that may receive a message from a network entity on a communication channel. The UE may further identify a cell identifier associated with the network entity. Moreover, the UE may perform at least one of a de-interleaving, de-rate-matching, or resource element de-mapping on the message based on the cell identifier.

Additional features of the present aspects are described in more detail below with respect to FIGS. 1-5.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one base station 105 in communication with a UE 110. The base station 105 may have a modem 160 including an interference randomization component 170, which may be configured to perform at least one of an interleaving 174, rate-matching 176, and/or resource element mapping 178 on one or more codewords (e.g., PBCH payloads) based on a cell identifier 172 such that interference is randomized between the base station 105 and another base station for or during PBCH transmissions.

In some aspects, a codeword may carry information a cell (e.g., of base station 105) has scheduled for transmission to the UE 110. A cell may typically permute the codeword before transmission. The permutation may be different for different cells. For instance, one or more cells may initially permute the codeword in a similar manner, but then may cyclic shift the permuted codeword by a specific value corresponding to the cell identifier 172.

For example, the PBCH codeword may be transmitted by cell c at time t as given by:

$$x(c,t)=G \cdot b(c,t),$$

where G is a (tall) generator matrix of the codeword (e.g., cyclic redundancy check (CRC) generator followed by Polar generator), and b(c, t) is a PBCH payload of cell c at time t.

Further, in an example scenario including two cells $c_1$ and $c_2$, transmissions of PBCH at transmission times $t_1$ and $t_2$ that lie within a BCH TTI may be considered from each cell. For instance, if the times $t_1$ and $t_2$ lie in an even and the next odd SFNs respectively, then the PBCH payload of both cells may change in identical fashion such that the change may be restricted to the bit locations of certain timing bits (i.e., the bits conveying SFN, SS block index, etc.) Therefore, at least for certain values of $t_1$ and $t_2$, the PBCH payloads of both cells may be represented or have the following relationship:

$$b(c_1,t_1)+b(c_1,t_2)=b(c_2,t_1)+b(c_2,t_2)=\delta(t_1,t_2)$$

where '+' is in a Galois Field of two element (e.g., GF(2)) (i.e., xor). $\delta(t_1,t_2)$ denotes the change in PBCH payload between $t_1$ and $t_2$ such that the change is the same for both the cells. Rearranging the above representation and applying G results in the following:

$$x(c_1,t_1)+x(c_2,t_1)=x(c_1,t_2)+x(c_2,t_2)$$

The xor (e.g., relative scrambling) between the codeword of cells $c_1$ and the codeword of cell $c_2$ is identical at times $t_1$ and $t_2$. Therefore, if the codewords are interleaved, rate-matched, and resource element mapped in an identical manner for the two cells, there may be no interference randomization arising from the transmitted bits.

However, the interference randomization component 170 may be configured to perform at least one of the rate-matching 176, interleaving 174, and/or resource element mapping 178, in a cell-specific manner to introduce interference randomization between two or more cells based on the following:

$$x(\cdot, t_2) = G \cdot b(\cdot, t_2)$$
$$= G \cdot [b(\cdot, t_1) + \delta(t_1, t_2)]$$
$$= x(\cdot, t_1) + G \cdot \delta(t_1, t_2)$$

Specifically, the codeword transmitted at time $t_2$ may be a scrambled version of the codeword transmitted at time $t_1$, where the scrambling $G \cdot \delta(t_1,t_2)$ is identical for all cells. However, if at least one of the interleaving 174, rate-matching 176, or resource element mapping 178 is performed differently between two cells, the scrambling sequence $G \cdot \delta(t_1,t_2)$ may be mapped to physical resource elements differently between the two cells, resulting in inter-cell interference randomization between the two cells.

In some aspects, the interleaving 174 for a cell c may be represented by an N×N permutation matrix Q(c), where N denotes the size of the codeword in bits or the number of bits being interleaved. For example, Q(c)·x gives the interleaved codeword. For example, permutation matrix Q(c) may cyclic shift matrix the codeword by an amount dependent c, such as mod(c,N). In some aspects, the interference randomization component 170 may apply a defined permutation and then cyclic shift the permutation by a value corresponding to the cell identifier 172.

In some aspects, rate-matching 176 for a cell c may be represented by an M×N matrix R(c), where M denotes the number of rate-matched bits. For example, each row of R(•) may be exactly one '1' and all other elements '0'. For PBCH, M may be greater than N such that at least some coded bits are repeated in the transmission. However, M may also be less than or equal to N. Then, $R(c) \cdot Q(c) \cdot x$ gives a (column) vector of coded rate-matched bits for the codeword x. For example, matrix R(c) may be equivalent to reading M bits from N bit long circular buffer, where the reading starts from a c-dependent index, such as, mod(c, N).

Further, rate-matched bits may then be further processed, such as, modulated, layer mapped and precoded, to generate symbols (e.g., complex numbers) to be mapped to available resource elements. Resource elements may be or otherwise correspond to subcarriers on one or more OFDM symbols or transmission times. In an implementation, operator S(c) represents the above processing to generate symbols for mapping to available resource elements. For instance, $S(c) \cdot R(c) \cdot Q(c) \cdot x$ may provide an L x 1 vector of symbols to be mapped to L total available REs. The foregoing processing may not be cell-specific, i.e., usually S(c)=S for all cells c.

In some aspects, resource element mapping for a cell c may be represented by an L×L permutation matrix T (c). For example, vector T $(c) \cdot S(c) \cdot R(c) \cdot Q(c) \cdot x$ gives the RE mapping, e.g., $l^{th}$ element of the vector is mapped to the $l^{th}$ RE. For example, permutation matrix T(c) may map the symbols to REs with c-dependent offset or cyclic shift, such as, mod(c,L).

In the two cell example scenario, inter-cell interference randomization may be introduced between times $t_1$ and $t_2$ by making at least one of the interleaving 174, rate-matching 176, and/or resource mapping 178 different between cells $c_1$ and $c_2$. For instance, if the interleaving is different between the two cells, i.e., $Q(c_1) \neq Q(c_2)$, the following may be provided:

$$Q(c) \cdot x(c, t_2) = Q(c) \cdot [x(c, t_1) + G \cdot \delta(t_1, t_2)]$$
$$= Q(c) \cdot x(c, t_1) + Q(c) \cdot G \cdot \delta(t_1, t_2)$$

So xor of interleaved codewords of cells $c_1$ and $c_2$ may be different between times $t_1$ and $t_2$:

$Q(c_1) \cdot x(c_1,t_1) + Q(c_2) \cdot x(c_2,t_1) \neq Q(c_1) \cdot x(c_1,t_1) + Q(c_2) \cdot x(c_2,t_1) + (Q(c_1) + Q(c_2)) \cdot G \cdot \delta(t_1,t_2)$ due to the $Q(c_1) \cdot G \cdot \delta(t_1,t_2)$ vs $Q(c_2) \cdot G \cdot \delta(t_1,t_2)$ interleaving of the non-zero 'scrambling sequence' $G \cdot \delta(t_1,t_2)$.

More generally, the signal transmitted at time $t_2$ in terms of codeword at time may be provided by:

$T(c) \cdot S(c) \cdot R(c) \cdot Q(c) \cdot x(c,t_2) = T(c) \cdot S(c) \cdot R(c) \cdot Q(c) \cdot [x(c, t_1) + G \cdot \delta(t_1,t_2)] = T(c) \cdot S(c) \cdot [R(c) \cdot Q(c) \cdot x(c,t_1) + R(c) \cdot Q(c) \cdot G \cdot \delta(t_1,t_2)]$.

As such, if at least one of the interleaving 174, rate-matching 176, or resource element mapping 178 are different between the two cells, the desired inequality may be represented as follows:

$[T(c_1) \cdot S(c_1) \cdot R(c_1) \cdot Q(c_1) \cdot x(c_1, t_1)] \circ$
$[T(c_2) \cdot S(c_2) \cdot R(c_2) \cdot Q(c_2) \cdot x(c_2, t_1)]^* \neq$
$[T(c_1) \cdot S(c_1) \cdot [R(c_1) \cdot Q(c_1) \cdot x(c_1, t_1) + R(c_1) \cdot Q(c_1) \cdot G \cdot \delta(t_1, t_2)]] \circ$
$[T(c_2) \cdot S(c_2) \cdot [R(c_2) \cdot Q(c_2) \cdot x(c_2, t_1) + R(c_2) \cdot Q(c_2) \cdot G \cdot \delta(t_1, t_2)]]^*$ In some aspects, if $\delta(t_1,t_2)$ were equal to a zero vector (i.e., payload hadn't changed between the two transmissions), then the cell-specific rate-matching 176, interleaving 174, and/or resource element mapping 178 may not have produced any interference randomization. In LTE for example, $\delta(t_1,t_2)$ may be zero within a BCH TTI. Hence, the implementation may not have resulted in inter-cell interference randomization.

However, in NR, as described herein, $\delta(t_1,t_2)$ may be non-zero and, at least for some values of $t_1$ and $t_2$, identical for all cells. Therefore, even though $\delta(t_1,t_2)$ is non-zero, interference randomization may not be obtained based solely on such parameter. The implementation may exploit such non-zero $\delta(t_1,t_2)$—even after remaining identical for multiple cells—and introduces interference through cell-dependent (e.g., cell identifier 172) rate-matching 176, interleaving 174, and/or resource element mapping 178.

Wireless communication network 100 may also include at least one UE 110 having a modem 140 including a message processing component 150. The message processing component 150 may receive a message from the base station 105 on a communication channel (e.g., PBCH). The base station 105 may identify the cell identifier 172 associated with the base station 105. The message processing component 150 may further perform at least one of a de-interleaving, de-rate-matching, or resource element de-mapping on the message based on the cell identifier 172.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), collectively referred to as Next Generation RAN (NG-RAN), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
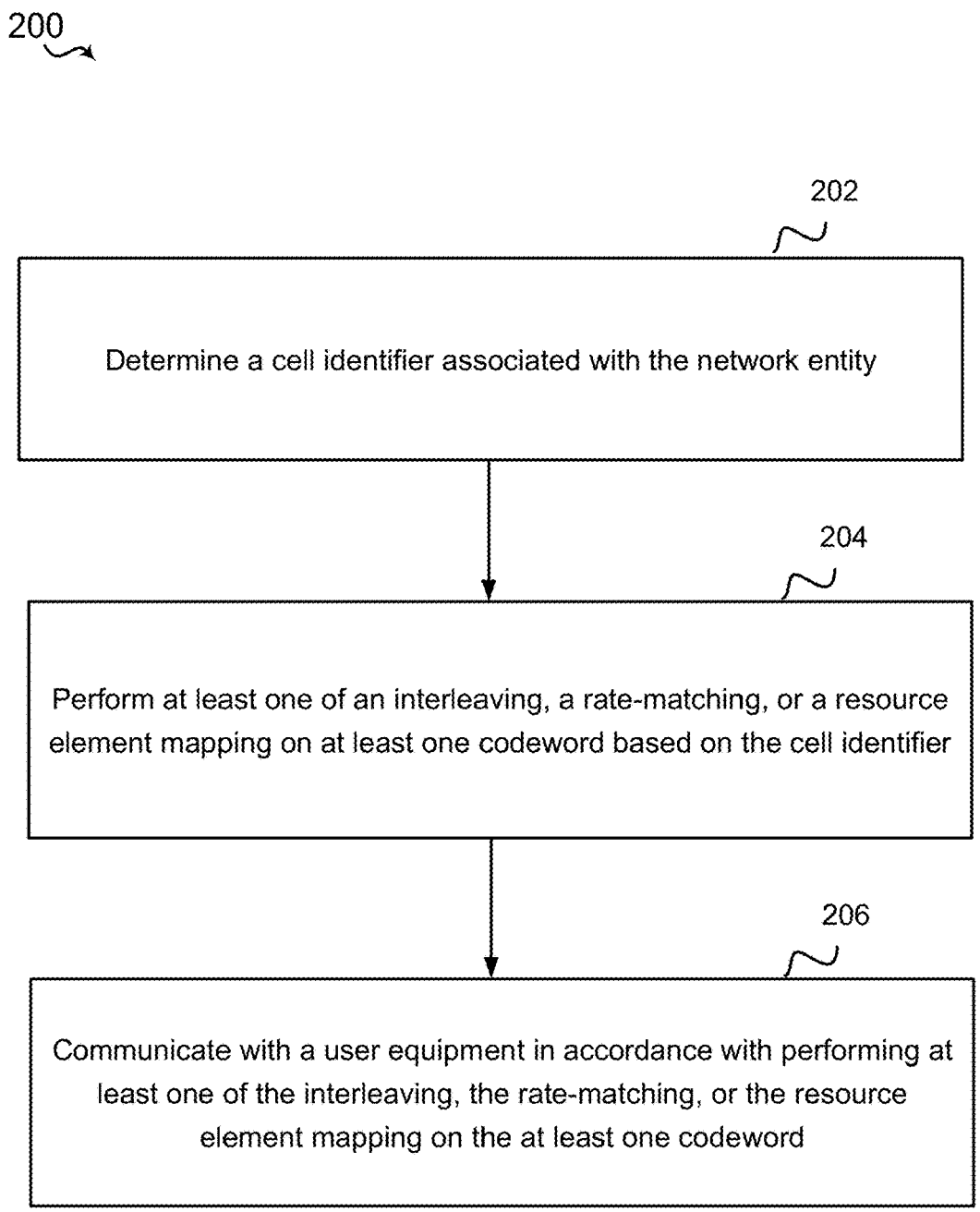
FIG. 2 is a flow diagram of an example of a method of wireless communication at a network entity.

Referring to FIG. 2, for example, a method 200 of wireless communication in operating a network entity such as base station 105 according to the aspects described herein to implement interference randomization between cells according to one or more of the herein-defined actions.

At block 202, the method 200 may determine a cell identifier associated with the network entity. For example, as described herein, modem 160 of base station 105 may execute interference randomization component 150 to determine a cell identifier 172 associated with the network entity. In some aspects, the cell identifier may be a physical cell identifier (PCI) or a global cell identity (CGI).

At block 204, the method 200 may perform at least one of an interleaving, rate-matching, or resource element mapping on at least one codeword based on the cell identifier. For example, as described herein, modem 160 of base station 105 may execute interference randomization component 150 to perform at least one of an interleaving 174, rate-matching 176, or resource element mapping 178 on at least one codeword based on the cell identifier 172.

In some aspects, performing at least one of the interleaving 174, rate-matching 176, or resource element mapping 178 on the at least one codeword includes adjusting at least one of the interleaving 174, rate-matching 176, or resource element mapping 178 based on the cell identifier 172.

In some aspects, wherein at least one of the interleaving 174, rate-matching 176, or resource element mapping 178 is adjusted as function of the cell identifier 172 such that a scrambling sequence of the at least one codeword is uniquely mapped to one or more resource elements.

In some aspects, the adjustment of at least one of the interleaving 174, rate-matching 176, or resource element mapping 178 based on the cell identifier 172 results in inter-cell interference randomization between the network entity (e.g., base station 105) and at least one other network entity (e.g., another base station 105).

In some aspects, the inter-cell interference randomization may correspond to an adjustment of a first physical resource element mapping of a PBCH payload of the network entity (e.g., base station 105) from a second physical resource element mapping of a PBCH payload of the at least one other network entity (e.g., another base station 105).

In some aspects, performing the interleaving 174 on the at least one codeword based on the cell identifier 172 includes applying a defined permutation to a matrix representing a size of the codeword, and adjusting the defined permutation as a function of the cell identifier 172.

In some aspects, performing the rate-matching 176 on the at least one codeword based on the cell identifier 172 includes determining a matrix having a size based on the size of the codeword and a number of rate-matched bits, and adjusting the rate-matched bits based on the cell identifier 172.

In some aspects, performing the resource element mapping 178 on the at least one codeword based on the cell identifier 172 includes determining a permutation matrix representing a number of resource elements corresponding to at least one subcarrier, identifying a resource element from the number of resource elements based on the cell identifier, and initiating mapping from the identified resource element.

At block 206, the method 200 may communicate with a UE in accordance with performing at least one of the interleaving, rate-matching, or resource element mapping on the at least one codeword. For example, as described herein, base station 105 may execute the transceiver 502 and/or RF front end 588 to communicate with a UE 110 in accordance with performing at least one of the interleaving 174, the rate-matching 176, or the resource element mapping 178 on the at least one codeword.

Figure 3:
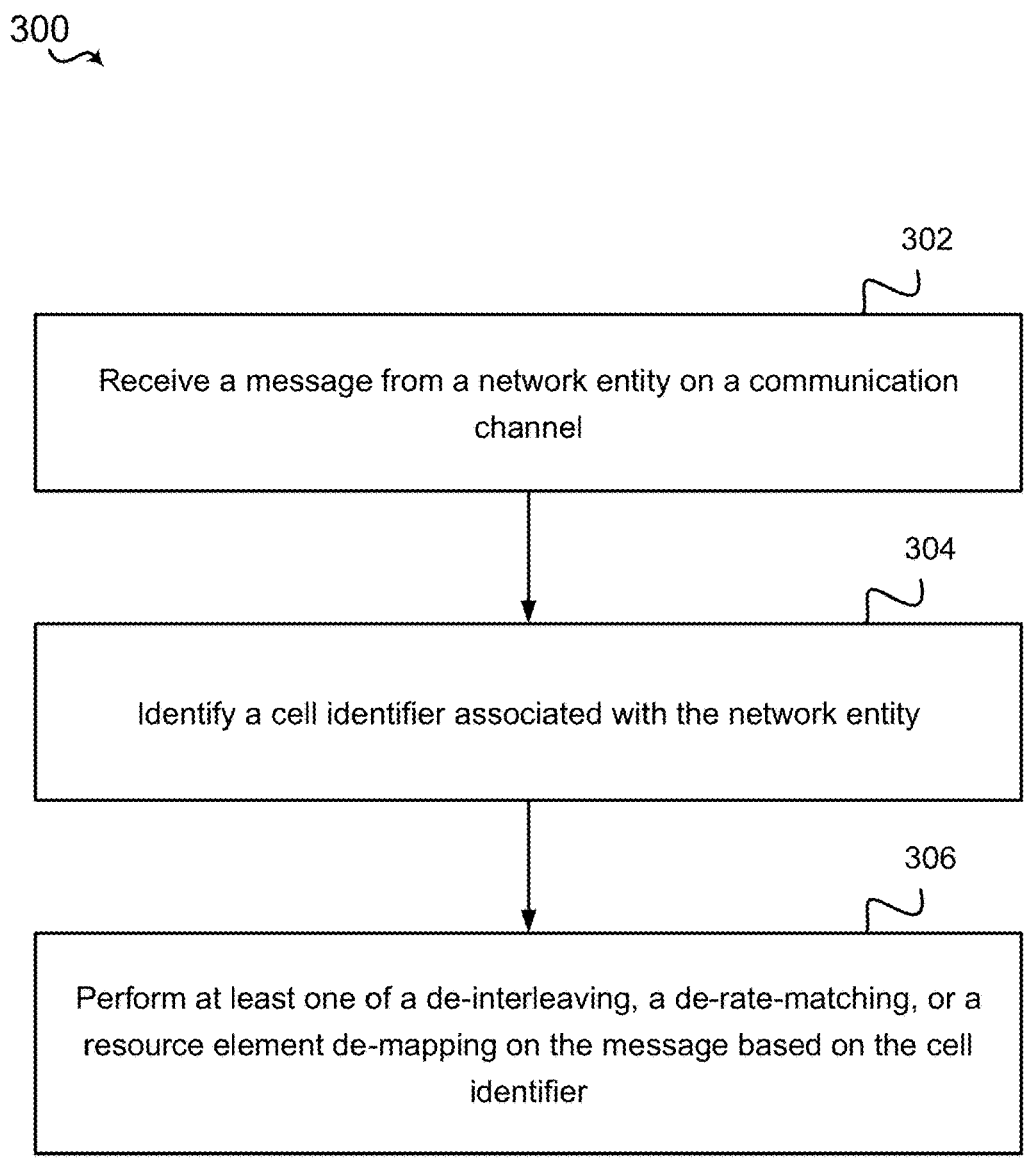
FIG. 3 is a flow diagram of another example of a method of wireless communication at a UE.

Referring to FIG. 3, for example, a method 300 of wireless communication in operating a UE such as UE 110 according to the aspects described herein to communicate with a network entity employing interference randomization according to one or more of the herein-defined actions.

At block 302, the method 300 may receive a message from a network entity on a communication channel. For example, as described herein, the UE 110 may execute a transceiver 402 and/or RF front end 488 to receive a message from a network entity (e.g., base station 105) on a communication channel (e.g., PBCH).

At block 304, the method 300 may identify a cell identifier associated with the network entity. For example, as described herein, the UE 110 may execute message processing component 150 to identify a cell identifier 172 associated with the network entity (e.g., base station 105).

At block 306, the method 300 may perform at least one of a de-interleaving, de-rate-matching, or resource element de-mapping on the message based on the cell identifier. For example, as described herein, the UE 110 may execute message processing component 150 to perform at least one of a de-interleaving, de-rate-matching, or resource element de-mapping on the message based on the cell identifier.

Figure 4:
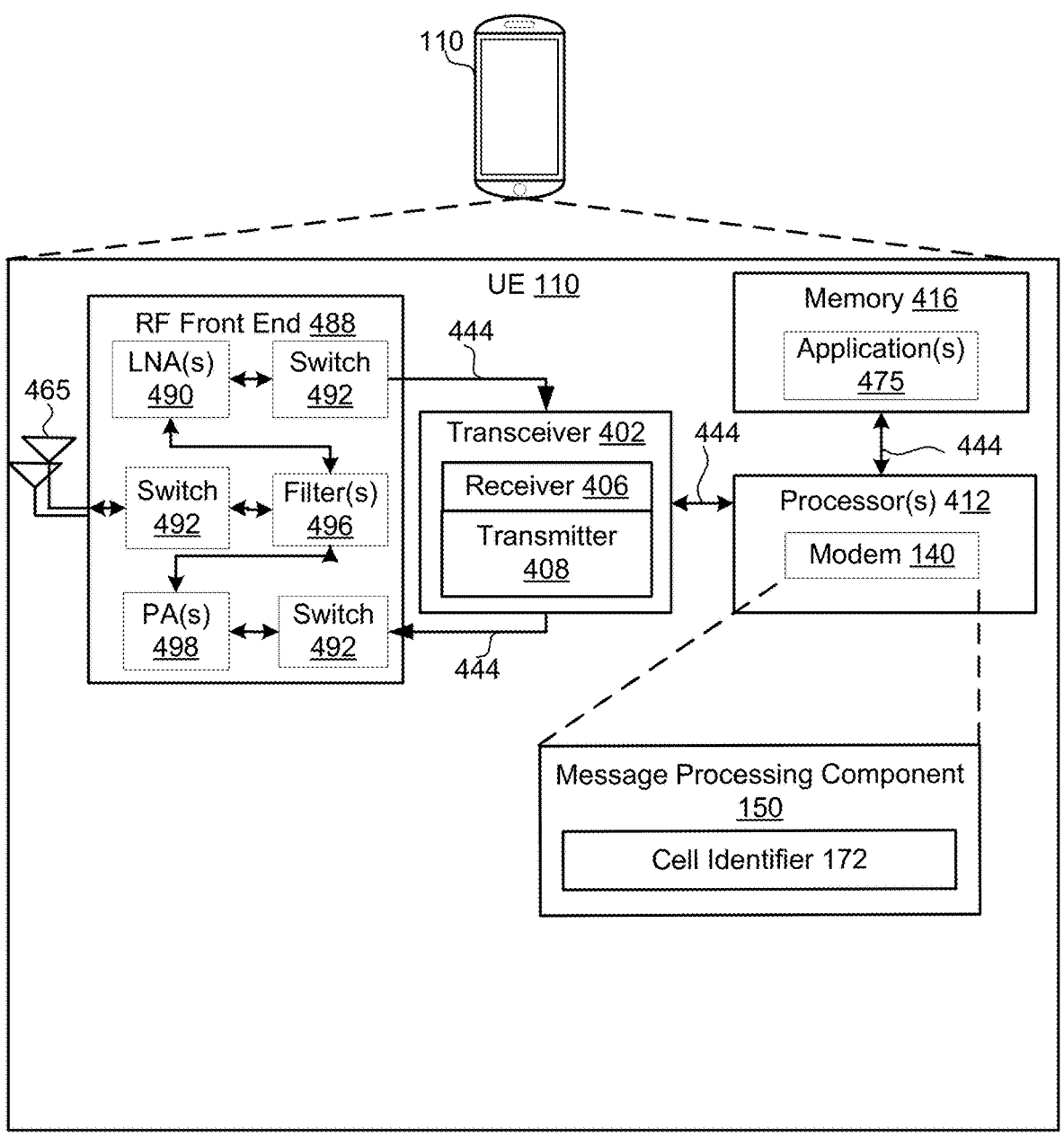
FIG. 4 is a schematic diagram of example components of the UE of FIG. 1.

Referring to FIG. 4, one example of an implementation of UE 110 may include a variety of components, some of which have already been described above, but including components such as one or more processors 412 and memory 416 and transceiver 402 in communication via one or more buses 444, which may operate in conjunction with modem 140 and message processing component 150 as described herein. Further, the one or more processors 412, modem 140, memory 416, transceiver 402, radio frequency (RF) front end 488 and one or more antennas 465, may be configured to support voice and/or data calls (simultaneously or non-simultaneously) in one or more radio access technologies. In some aspects, the modem 140 may be the same as or similar to the modem 140.

In an aspect, the one or more processors 412 can include a modem 140 that uses one or more modem processors. The various functions related to resource identification component 150 may be included in modem 140 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 140 associated with resource identification component 150 may be performed by transceiver 402.

Also, memory 416 may be configured to store data used herein and/or local versions of applications 475 or resource identification component 150 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining resource identification component 150 and/or one or more of its subcomponents, and/or data associated therewith, when UE 110 is operating at least one processor 412 to execute resource identification component 150 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a RF receiver. In an aspect, receiver 406 may receive signals transmitted by at least one base station 105. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may include, but is not limited to, an RF transmitter.

Moreover, in an aspect, UE 110 may include RF front end 488, which may operate in communication with one or more antennas 465 and transceiver 402 for receiving and transmitting radio transmissions, for example, wireless communications transmitted by at least one base station 105 or wireless transmissions transmitted by UE 110. The RF front end 488 may be communicatively couples with one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and a corresponding specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 402 to operate at a specified frequency and power level based on the UE configuration of the UE 110 and the communication protocol used by the modem 140.

In an aspect, the modem 140 can be a multiband-multimode modem, which can process digital data and communicate with transceiver 402 such that the digital data is sent and received using transceiver 402. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 110 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 5:
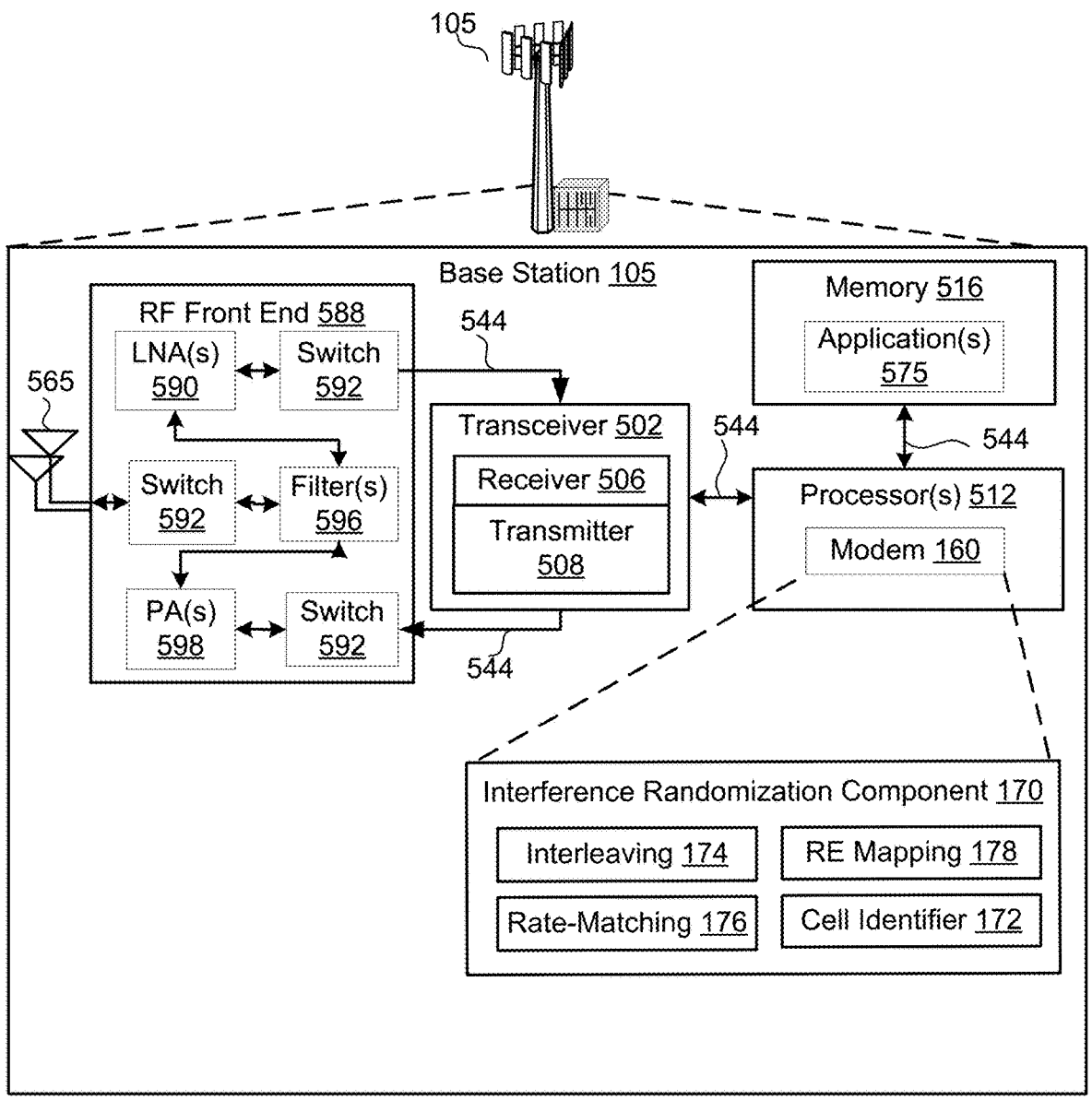
FIG. 5 is a schematic diagram of example components of the base station of FIG. 1.

Referring to FIG. 5, one example of an implementation of base station 105 may include a variety of components, some of which have already been described above, but including components such as one or more processors 512, a memory 516, and a transceiver 502 in communication via one or more buses 544, which may operate in conjunction with modem 160 and interference randomization component 170 to enable one or more of the functions described herein.

The transceiver 502, receiver 506, transmitter 508, one or more processors 512, memory 516, applications 575, buses 544, RF front end 488, LNAs 590, switches 592, filters 596, PAs 598, and one or more antennas 565 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a network entity, comprising:
   for each of a plurality of cells in a network:
   scrambling each of a plurality of physical broadcast channel (PBCH) payload codewords based on a scrambling sequence;
   rate-matching each scrambled codeword based on a cell identifier; and
   communicating, in the identified cell, with a user equipment in accordance with the rate-matched scrambled codewords.

2. The method of claim 1, wherein the rate-matching is adjusted as a function of the cell identifier such that a scrambling sequence of each codeword is uniquely mapped to one or more PBCH resource elements.

3. The method of claim 1, wherein the rate-matching based on the cell identifier results in an inter-cell interference randomization between the network entity and at least one other network entity.

4. The method of claim 3, wherein the inter-cell interference randomization corresponds to an adjustment of a first physical resource element mapping of a physical broadcast channel (PBCH) payload of the network entity from a second physical resource element mapping of a PBCH payload of at least one other network entity.

5. The method of claim 1, wherein performing the rate-matching on each codeword based on the cell identifier includes:

determining a matrix having a size based on the size of each codeword and a number of rate-matched bits; and adjusting the rate-matched bits based on the cell identifier.

6. A method of wireless communication at a user equipment (UE), comprising:

receiving a message from a network entity on a physical broadcast channel (PBCH) of a cell of the network entity;

identifying a cell identifier associated with the network entity based on a primary synchronization signal or secondary synchronization signal detection of the PBCH; and performing de-rate-matching on the message based on the cell identifier, the de-rate-matching is associated with a rate-matching that is adjusted as a function of the cell identifier such that a scrambling sequence including a non-zero PBCH payload of the message is uniquely mapped to one or more resource elements of the PBCH.

7. A network entity for wireless communications, comprising:

a memory; and at least one processor in communication with the memory, wherein the at least one processor is configured to:

scramble at least one physical broadcast channel (PBCH) codeword based on a scrambling sequence;

rate-matching each scrambled codeword based on a cell identifier; and communicate, in the identified cell, with a user equipment in accordance with performing the rate-matching on the scrambled rate-matched at least one codeword.

8. The network entity of claim 7, wherein the rate-matching is adjusted as a function of the cell identifier such that a scrambling sequence of each codeword is uniquely mapped to one or more PBCH resource elements.

9. The network entity of claim 7, wherein the rate-matching based on the cell identifier results in an inter-cell interference randomization between the network entity and at least one other network entity.

10. The network entity of claim 9, wherein the inter-cell interference randomization corresponds to an adjustment of a first physical resource element mapping of a physical broadcast channel (PBCH) payload of the network entity from a second physical resource element mapping of a PBCH payload of at least one other network entity.

11. The network entity of claim 7, wherein perform the rate-matching on each codeword based on the cell identifier, the at least one processor is further configured to:

determine a matrix having a size based on the size of each codeword and a number of rate-matched bits; and adjust the rate-matched bits based on the cell identifier.

12. A user equipment (UE) for wireless communications, comprising:

a memory; and at least one processor in communication with the memory, wherein the at least one processor is configured to:

receive a message from a network entity on a physical broadcast channel (PBCH) of a cell of the network entity;

identify a cell identifier associated with a cell of the network entity based on a primary synchronization signal or secondary synchronization signal detection; and perform at least a de-rate-matching on the message based on the cell identifier, the de-rate-matching is associated with a rate-matching that is adjusted as a function of the cell identifier such that a scrambling sequence including a non-zero broadcast communication payload of the at least one message is uniquely mapped to one or more resource elements of the PBCH.

13. A non-transitory computer-readable medium storing computer executable code that when executed by at least one processor of a network entity of a wireless network causes the network entity to, for each of a plurality of cells in the network: scramble each of a plurality of physical broadcast channel (PBCH) payload codewords based on a scrambling sequence; rate-match each scrambled codeword based on a cell identifier; and communicate, in the identified cell, with a user equipment in accordance with the rate-matched scrambled codewords.

14. The non-transitory computer-readable medium of claim 13, wherein the rate-matching is adjusted as a function of the cell identifier such that a scrambling sequence of each codeword is uniquely mapped to one or more PBCH resource elements.

15. The non-transitory computer-readable medium of claim 13, wherein the rate-matching based on the cell identifier results in an inter-cell interference randomization between the network entity and at least one other network entity.

16. The non-transitory computer-readable medium of claim 15, wherein the inter-cell interference randomization corresponds to an adjustment of a first physical resource element mapping of a physical broadcast channel (PBCH) payload of the network entity from a second physical resource element mapping of a PBCH payload of at least one other network entity.

17. The non-transitory computer-readable medium of claim 13, wherein performing the rate-matching on each codeword based on the cell identifier includes: determining a matrix having a size based on the size of each codeword and a number of rate-matched bits; and adjusting the rate-matched bits based on the cell identifier.

18. A non-transitory computer-readable medium storing computer executable code, that when executed by at least one processor of a user equipment (UE) a wireless network causes the UE to: receiving a message from a network entity on a physical broadcast channel (PBCH) of a cell of the network entity; identifying a cell identifier associated with the network entity based on a primary synchronization signal or secondary synchronization signal detection of the PBCH; and performing de-rate-matching on the message based on the cell identifier, the de-rate-matching is associated with a rate-matching that is adjusted as a function of the cell identifier such that a scrambling sequence including a non-zero PBCH payload of the message is uniquely mapped to one or more resource elements of the PBCH.

19. A network entity for wireless communications, comprising:

means for scrambling, for each of a plurality of cells in a network, each of a plurality of physical broadcast channel (PBCH) payload codewords based on a scrambling sequence;

means for rate-matching each scrambled codeword based on a cell identifier; and means for communicating, in the identified cell, with a user equipment in accordance with the rate-matched scrambled codewords.

20. The network entity of claim 19, wherein the rate-matching is adjusted as a function of the cell identifier such that a scrambling sequence of each codeword is uniquely mapped to one or more PBCH resource elements.

21. The network entity of claim 19, wherein the rate-matching based on the cell identifier results in an inter-cell interference randomization between the network entity and at least one other network entity.

22. The network entity of claim 21, wherein the inter-cell interference randomization corresponds to an adjustment of a first physical resource element mapping of a physical broadcast channel (PBCH) payload of the network entity from a second physical resource element mapping of a PBCH payload of at least one other network entity.

23. The network entity of claim 19, wherein means performing the rate-matching on each codeword based on the cell identifier includes:
  means determining a matrix having a size based on the size of each codeword and a number of rate-matched bits; and
  means adjusting the rate-matched bits based on the cell identifier.

24. A user equipment (UE) of a wireless network, comprising:
  means receiving a message from a network entity on a physical broadcast channel (PBCH) of a cell of the network entity;
  means identifying a cell identifier associated with the network entity based on a primary synchronization signal or secondary synchronization signal detection of the PBCH; and
  means performing de-rate-matching on the message based on the cell identifier, the de-rate-matching is associated with a rate-matching that is adjusted as a function of the cell identifier such that a scrambling sequence including a non-zero PBCH payload of the message is uniquely mapped to one or more resource elements of the PBCH.

* * * * *